United States Patent
Okada et al.

[11] Patent Number: 5,673,698
[45] Date of Patent: Oct. 7, 1997

[54] MULTICHANNEL ULTRASONIC DIAGNOSIS APPARATUS

[75] Inventors: Kazutaka Okada, Iwatsuki; Akira Sasaki, Ichikawa, both of Japan

[73] Assignee: Hitachi Medical Corporation, Tokyo, Japan

[21] Appl. No.: 400,842

[22] Filed: Mar. 8, 1995

[30] Foreign Application Priority Data

Apr. 21, 1994 [JP] Japan ................................. 6-105045

[51] Int. Cl.$^6$ ....................................... A61B 8/00
[52] U.S. Cl. ..................... 128/661.01; 128/662.03
[58] Field of Search ................. 128/661.01, 660.07; 367/103, 105; 73/626

[56] References Cited

U.S. PATENT DOCUMENTS

| | | | |
|---|---|---|---|
| 4,726,230 | 2/1988 | Yoshikawa et al. | 128/661.01 X |
| 4,811,740 | 3/1989 | Ikeda et al. | 128/660.01 |
| 4,890,267 | 12/1989 | Rudolph | 128/661.01 X |
| 5,186,175 | 2/1993 | Hirama et al. | 128/660.07 X |
| 5,318,027 | 6/1994 | Fukui | 128/660.01 |
| 5,351,690 | 10/1994 | Okada et al. | 128/661.01 |

FOREIGN PATENT DOCUMENTS 5652044  3/1979  Japan.
5652045  3/1979  Japan.

*Primary Examiner*—Francis Jaworski
*Attorney, Agent, or Firm*—Antonelli, Terry, Stout & Kraus, LLP.

[57] ABSTRACT

A probe having one vibrator element array containing at least two groups of vibrator elements. The number of vibrator elements belonging to each of the groups is an ordinary number. At least two probe-side connectors are provided correspondingly to the groups. A plurality of connectors capable of being connected to the probe-side connectors are provided in a diagnosis apparatus body. In the vibrator element array, not only ultrasonic transmission signals can be transmitted to arbitrary elements simultaneously but ultrasonic reception signals can be received from the arbitrary elements simultaneously. Accordingly, vibrator elements belonging to different groups in the probe connected to the body are activated substantially simultaneously.

8 Claims, 6 Drawing Sheets

MULTICHANNEL ULTRASONIC DIAGNOSIS APPARATUS

BACKGROUND OF THE INVENTION

The present invention relates to an ultrasonic diagnosis apparatus.

A conventional ultrasonic diagnosis apparatus comprises: a probe constituted by a large number of vibrator elements or transducers arranged in multichannels for transmitting ultrasonic waves to a subject and for receiving ultrasonic waves from the subject; a diagnosis apparatus body including transmission-reception circuits for supplying ultrasonic transmission signals to the probe and for amplifying ultrasonic reception signals received from the probe, a reception wave phasing circuit for giving predetermined delays to the reception signal obtained from the transmission-reception circuits to thereby perform reception wave phasing, and an image processing circuit for applying predetermined processing to the output signal of the reception wave phasing circuit to thereby generate an image signal; and a display for displaying the image signal obtained from the image processing circuit included in the body.

One connector constituted by a predetermined ordinary number of pins (for example, 256 pins) is provided in the aforementioned probe. This connector is connected to another connector provided in the input portion of the apparatus body and constituted by an ordinary number of pins so that transmission/reception signals are exchanged between the probe and the apparatus body through the connectors. In this case, various type of probes different in the shape, in the number of vibrator elements, in the frequency of ultrasonic transmission wave, and so on, are prepared in advance as the aforementioned probe, so that a desirable probe to be used can be selected from the different types of probes by changing connection in the aforementioned portion of the connectors.

In the aforementioned conventional apparatus, however, one connector constituted by an ordinary number of pins is simply provided in the probe. Accordingly, no probe but a probe having vibrator elements the number of which is in the range of the number of pins contained in the connector can be connected. Accordingly, if it is intended to connect a probe formed as a multichannel probe in which the number of vibration elements is set to a larger value than the ordinary number of pins or vibrator elements are arranged two-dimensionally, it is impossible to connect the probe through one connector formed to be adapted to the ordinary number of pins. On the contrary, it may be preferable that a new connector having a larger number of pins is produced and used, but in this case, the aforementioned probe having the ordinary number of vibrator elements cannot be connected. Further, in a probe having vibrator elements arranged two-dimensionally in the direction of the major axis of the probe and in the direction of the minor axis thereof, the number of vibrator elements increases remarkably, so that there is a limitation in production of a large-sized connector having a newly increased number of pins. From these points of view, the conventional apparatus often cannot be fitted fully to the use of vibrator elements of the probe as a multichannel structure required recently.

There is known an ultrasonic diagnosis apparatus having a plurality of connectors so that a plurality of probes can be connected to the connectors, respectively, in use of the apparatus. In this apparatus, however, all the plurality of probes are not activated simultaneously in use of the apparatus. Ultrasonic waves are transmitted from only one probe connected to a selected one of the connectors. That is, only one of the channels connecting the plurality of connectors to the transmission-reception circuits in the apparatus body is selected to activate only one of the probes in one unit time required for activating a group of vibrator element arrays simultaneously or required for activating a group of vibrator element arrays sequentially (through scanning) to obtain one image.

JP-A 56-52044 and JP-A 56-52045 disclose an apparatus in which two tomographic images perpendicular to each other are formed substantially simultaneously by using a probe having two vibrator element arrays perpendicular to each other. In the disclosed apparatus, the probe has two connectors provided correspondingly to the respective vibration element arrays and connected to body-side connectors, respectively. Two images are formed and displayed apparently simultaneously by activating the respective arrays alternately and speedily. Also even in this case, vibrator elements belonging to different arrays are not activated simultaneously per unit time as described above. That is, it is to be understood that this probe is constituted by a combination of two independent probes.

SUMMARY OF THE INVENTION

An object of the present invention is to solve at least one of the aforementioned problems.

In the present invention, a probe has one vibrator element or transducer array containing at least two groups of vibrator elements. The number of vibrator elements belonging to each of the groups is an ordinary number as described above. At least two probe-side connectors are provided correspondingly to the groups. Accordingly, the number of pins in each of the probe-side connectors is an ordinary number as described above. A plurality of connectors capable of being connected to the probe-side connectors are provided in a diagnosis apparatus body.

In the present invention, vibrator elements belonging to different groups in the probe connected to the body are activated simultaneously in unit time. That is, ultrasonic transmission/reception signals are exchanged between the probe and the body simultaneously or sequentially over a plurality of connectors. From the point of view of using a known image processing method directly, it is preferable that the number of vibrator elements activated simultaneously is set to a value (for example, 256) corresponding to the ordinary number (for example, 256) of pins in each of the connectors.

It is a matter of course that it is possible to activate vibrator elements belonging to only one group in the same manner as in the conventional case.

BRIEF DESCRIPTION OF THE DRAWINGS

These and other objects and technical advantages of the present invention will be readily apparent from the following description of the preferred exemplary embodiments of the invention in conjunction with the accompanying drawings, in which.

DESCRIPTION OF THE PREFERRED EMBODIMENTS

Embodiments of the present invention will be described below in detail with reference to the accompanying drawings.

Figure 1:
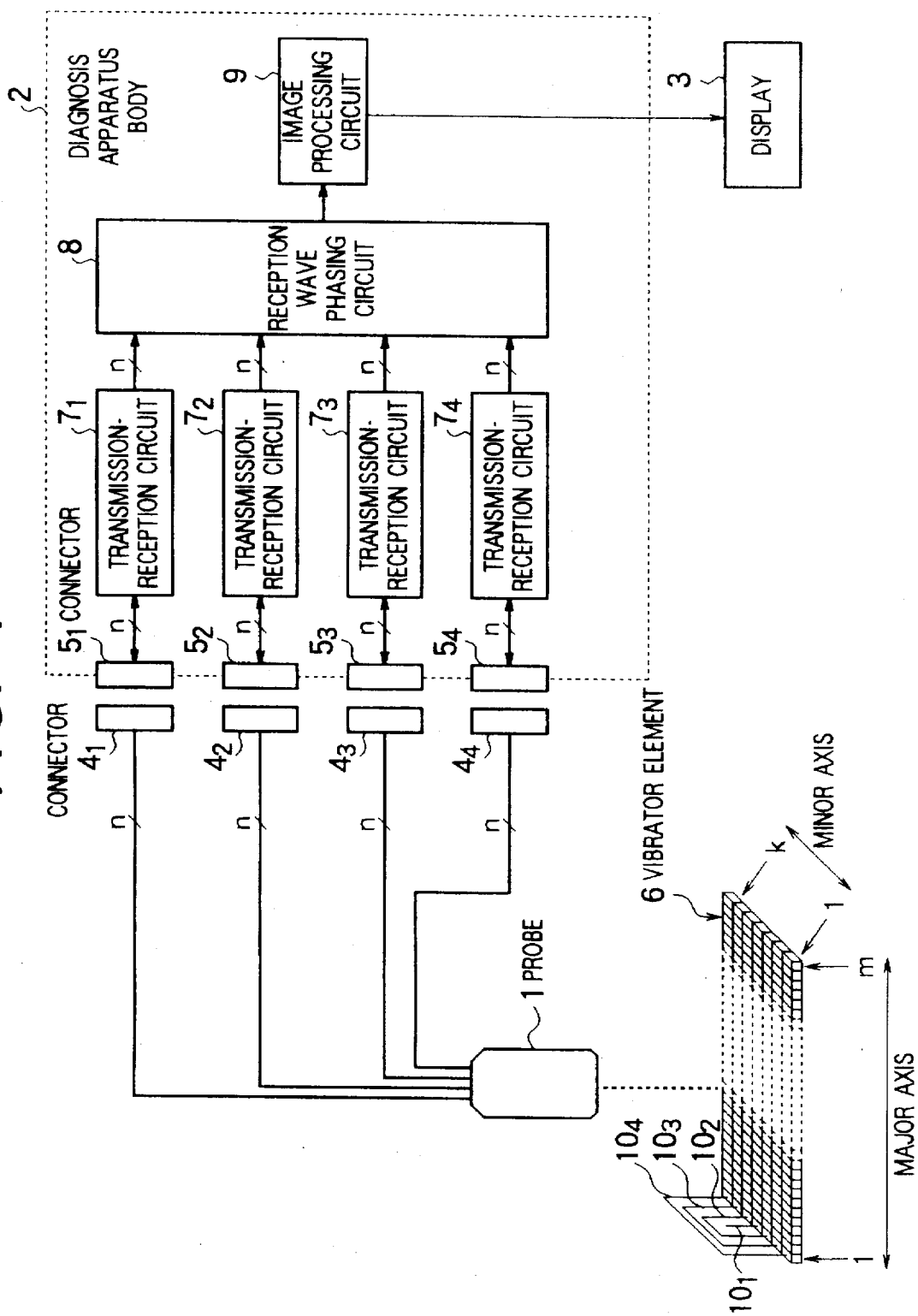
FIG. 1 is a block diagram showing the configuration of an ultrasonic diagnosis apparatus according to a first embodiment of the present invention.

FIG. 1 is a block diagram showing an embodiment of an ultrasonic diagnosis apparatus according to the present invention. This apparatus transmits ultrasonic waves into a subject, receives ultrasonic waves from the subject, forms an ultrasonic image of a region having a need of diagnosis, and displays the ultrasonic image. As shown in FIG. 1, this apparatus comprises a probe 1, a diagnosis apparatus body 2, and an image display 3. Further, this apparatus further comprises a plurality of connectors $4_1$, $4_2$, $4_3$ and $4_4$ provided on the probe 1 side, and a plurality of connectors $5_1$, $5_2$, $5_3$ and $5_4$ provided on the apparatus body 2 side.

The probe 1 is provided for transmitting ultrasonic waves into a subject and receiving ultrasonic waves from the subject. For example, the probe 1 is formed as a multichannel probe by aligning a large number of rectangularly formed vibrator elements or transducers 6. In the embodiment shown in FIG. 1, the vibrator elements 6 are arranged so that a number $m$ of channels (No. 1 channel to No. $m$ channel) are formed in the direction of the major axis of the probe 1 and a number $k$ of channels (No. 1 channel to No. $k$ channel) are formed in the direction of the minor axis of the probe 1 by cutting each of the elongated elements $m$ into a number of respective elements $k$. Further, the vibrator elements 6 are designed so that transmission/reception waves are focused even in the direction of the minor axis by changing delays given to respective vibrator elements 6 (No. 1 channel to No. $k$ channel) in the direction of the minor axis. Further, the vibrator elements 6 are designed so that transmission waves are weighted by changing the amplitude values of ultrasonic transmission signals given to respective vibrator elements 6 in the direction of the minor axis and reception waves are weighted by changing the amplification/attenuation factors of ultrasonic reception signals obtained from the respective vibrator elements 6 in the direction of the minor axis. Further, the vibrator elements 6 are designed so that aperture control can be performed by switching on and off the respective vibrator elements 6 in the direction of the minor axis. By these designs, the quality of the resulting ultrasonic image is improved.

The apparatus body 2 is provided for transmitting and receiving ultrasonic waves by driving the probe 1 and for processing reception signals to form an image signal. The apparatus body 2 includes transmission-reception circuits 7, a reception wave phasing circuit 8, and an image processing circuit 9. The transmission-reception circuits 7 are provided for giving ultrasonic transmission signals to the probe 1 and for receiving ultrasonic reception signals from the probe 1 and amplifying the ultrasonic reception signals. For example, four transmission-reception circuits $7_1$ to $7_4$ are provided in parallel in relation to a plurality of connectors $5_1$ to $5_4$ which will be described later. The reception wave phasing circuit 8 is provided for giving predetermined delays to ultrasonic reception signals outputted from the transmission-reception circuits $7_1$ to $7_4$ to thereby perform reception wave phasing. The reception wave phasing circuit 8 is designed to give predetermined delays to reflection echo signals received from the subject by the respective vibrator elements 6 of the probe 1 and add up the reception signals in the respective channels. Further, the image processing circuit 9 is provided for applying predetermined processing to the output signal of the reception wave phasing circuit 8 to thereby form an image signal. For example, the image processing circuit 9 is designed to perform signal processing such as logarithmic compression, detection, etc. to thereby convert the output signal of the reception wave phasing circuit 8 into an image signal such as a television signal, etc. Further, the image display 3 is provided for displaying the image signal outputted from the image processing circuit 9 as an ultrasonic image. For example, the image display 3 is constituted by a television monitor.

Here, in the present invention, the probe 1 is provided with a plurality of connectors, for example, four connectors $4_1$ to $4_4$, connected to vibrator element groups obtained by grouping the large number of vibrator elements 6 arranged in the inside of the probe 1 into parts of the same predetermined number whereas the input portion of the apparatus body 2 is provided with a plurality of connectors, for example, four connectors $5_1$ to $5_4$, connected to the plurality of connectors $4_1$ to $4_4$ to supply ultrasonic reception signals obtained from the probe 1 to the transmission/reception circuits $7_1$ to $7_4$ in the inside of the apparatus body 2.

The reason why a plurality of connectors, for example, four connectors $4_1$ to $4_4$, are provided on the probe 1 side is as follows. This is because the probe 1 has m×k (m×k>n) vibrator elements 6 in total arranged as a matrix of $k$ rows in the direction of the minor axis and $m$ columns in the direction of the major axis in its inside, that is, the probe 1 has a larger number of vibrator elements 6 than an ordinary probe, so that it is impossible to connect all vibrator elements 6 of the probe 1 shown in FIG. 1 to the apparatus body 2 if one generally used conventional connector capable of connecting $n$ vibrator elements is used. In the present invention, therefore, each of the aforementioned connectors $4_1$ to $4_4$ is provided as a connector capable of connecting $n$ vibrator elements, so that 4×n (4×n≧m×k) vibrator elements 6 in total at the maximum can be connected by the four connectors. Incidentally, in the example shown in FIG. 1, vibrator elements 6 symmetrical with respect to the center axis in the direction of the minor axis are connected to each other by leads $10_1$, $10_2$, $10_3$ and $10_4$ in order to perform focusing in the direction of the minor axis of the probe 1, weighting and aperture control. Further, vibrator element groups obtained by grouping the vibrator elements 6 into equal parts of the same predetermined number may be preferably connected to the connectors $4_1$ to $4_4$, respectively.

Further, the apparatus body 2 side connectors $5_1$ to $5_4$ are provided as four connectors each capable of connecting $n$ vibrator elements correspondingly to the four connectors $4_1$ to $4_4$ in order to receive the reception signals obtained from the probe 1, that is, 4×n vibrator elements 6 in total at the maximum can be connected by the four connectors. Incidentally, of these connectors $5_1$ to $5_4$, the first connector $5_1$ serves to feed a signal to the first transmission-reception circuit $7_1$, the second connector $5_2$ serves to feed a signal to the second transmission-reception circuit $7_2$, the third connector $5_3$ serves to feed a signal to the third transmission-reception circuit $7_3$, and the fourth connector $5_4$ serves to feed a signal to the fourth transmission-reception circuit $7_4$.

Further, after the probe 1 side connectors $4_1$ to $4_4$ are connected to the apparatus body 2 side connectors $5_1$ to $5_4$, respectively, by insertion, transmission/reception of ultrasonic waves from the large number (m×k) of vibrator elements 6 contained in the probe 1 is performed while the vibrator element groups obtained by the aforementioned grouping are scanned successively over combinations ($4_1$, $5_1$), ($4_2$, $5_2$), ($4_3$, $5_3$) and ($4_4$, $5_4$) of the plurality of connectors to thereby perform an operation to form one ultrasonic image. In this manner, the probe 1 formed as a multichannel probe by arranging a large number of vibrator elements 6 can be connected to the apparatus body 2 by the plurality of connectors $4_1$ to $4_4$ each having an ordinary number of pins so that ultrasonic images can be collected as one image.

In this embodiment, scanning over the plurality of connectors is performed as follows.

At the first clock pulse, that is, at the first unit time, n vibrator elements $4_{11}$ to $4_{1n}$ belonging to a group corresponding to the connector $4_1$ are activated. At the next clock pulse, n−1 vibrator elements $4_{12}$ to $4_{1n}$ belonging to the group corresponding to the connector $4_1$ and a vibrator element $4_{21}$ belonging to a group corresponding to the connector $4_2$, that is, n vibrator elements in total, are activated. Thereafter, n vibrator connectors $4_{13}$ to $4_{1n}$, $4_{21}$ and $4_{22}$, . . . , n vibrator connectors $4_{1n}$ and $4_{21}$ to $4_{2n-1}$, . . . , n vibrator connectors $4_{21}$ to $4_{2n}$, n vibrator elements $4_{22}$ to $4_{2n}$ and $4_{31}$, . . . , n vibrator connectors $4_{3n}$ and $4_{41}$ to $4_{4n-1}$, and n vibrator elements $4_{41}$ to $4_{4n}$ are scanned successively.

Because the number of vibrator elements activated simultaneously is n, general methods can be used for feeding ultrasonic transmission/reception signals to such elements and processing the reception signals to form an image. For example, it is thought of that the hardware and software structures of an ultrasonic diagnosis apparatus (type: EUB-565A or EUB-555) provided by Hitachi Medical Corporation can be used directly as long as the structures are modified more or less.

On the other hand, an apparatus of controlling vibrator elements individually and a method therefor have been described in patent application Ser. No. 08/400,841 (Title: Ultrasonic Diagnostic Apparatus; Inventors: Okada et al; Assignee: Hitachi Medical Corporation; Assignee Reference: 94005) which was filed on the same date as the application of the present invention, now U.S. Pat. No. 5,517,996. This Patent Application is incorporated herein by reference.

Figure 2:
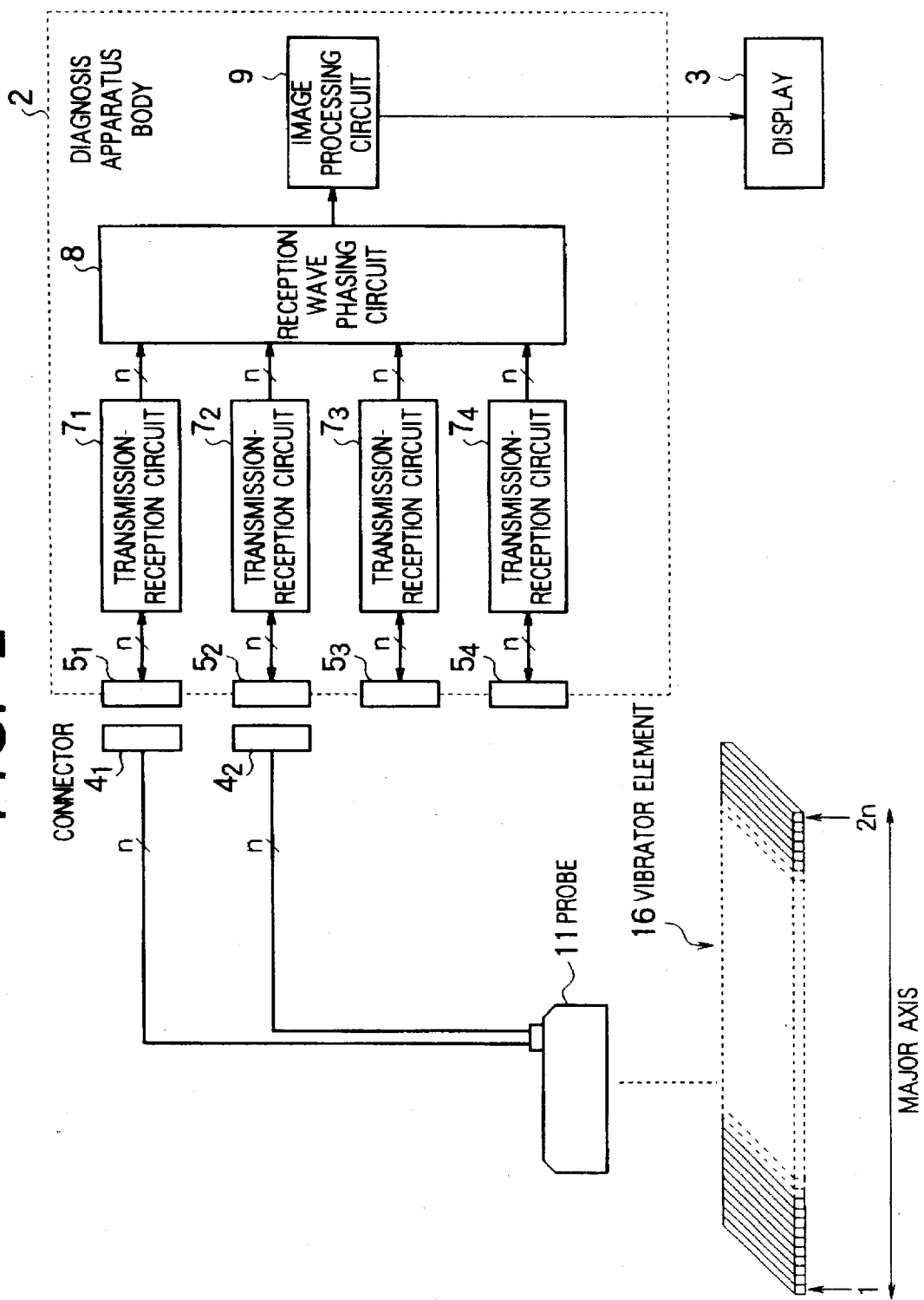
FIG. 2 is a block diagram showing the configuration of an ultrasonic diagnosis apparatus according to a second embodiment of the present invention.

FIG. 2 is a block diagram showing a second embodiment of the present invention. This embodiment is designed so that a probe 11 in which the number of vibrator elements 16 in the direction of the major axis is twice (2n) as large as the number of vibrator elements contained in a general probe is connected to the apparatus body 2 shown in FIG. 1. In this case, two connectors $4_1$ and $4_2$ each capable of connecting n vibrator elements may be preferably connected to the probe 11 and connected to any two of the four connectors $5_1$ to $5_4$ provided in the apparatus body 2 side input portion. Incidentally, when the probe is a linear probe, a convex probe or the like, vibrator elements used simultaneously for ultrasonic transmission/reception are not always all elements, that is, vibrator element groups obtained by grouping all vibrator elements into equal parts of the same predetermined number are scanned successively while shifting. Further, the vibrator element groups obtained by the aforementioned grouping are scanned successively over the aforementioned two connectors $4_1$ and $4_2$ (multi-connector overscanning) to thereby form one ultrasonic image.

Figure 3:
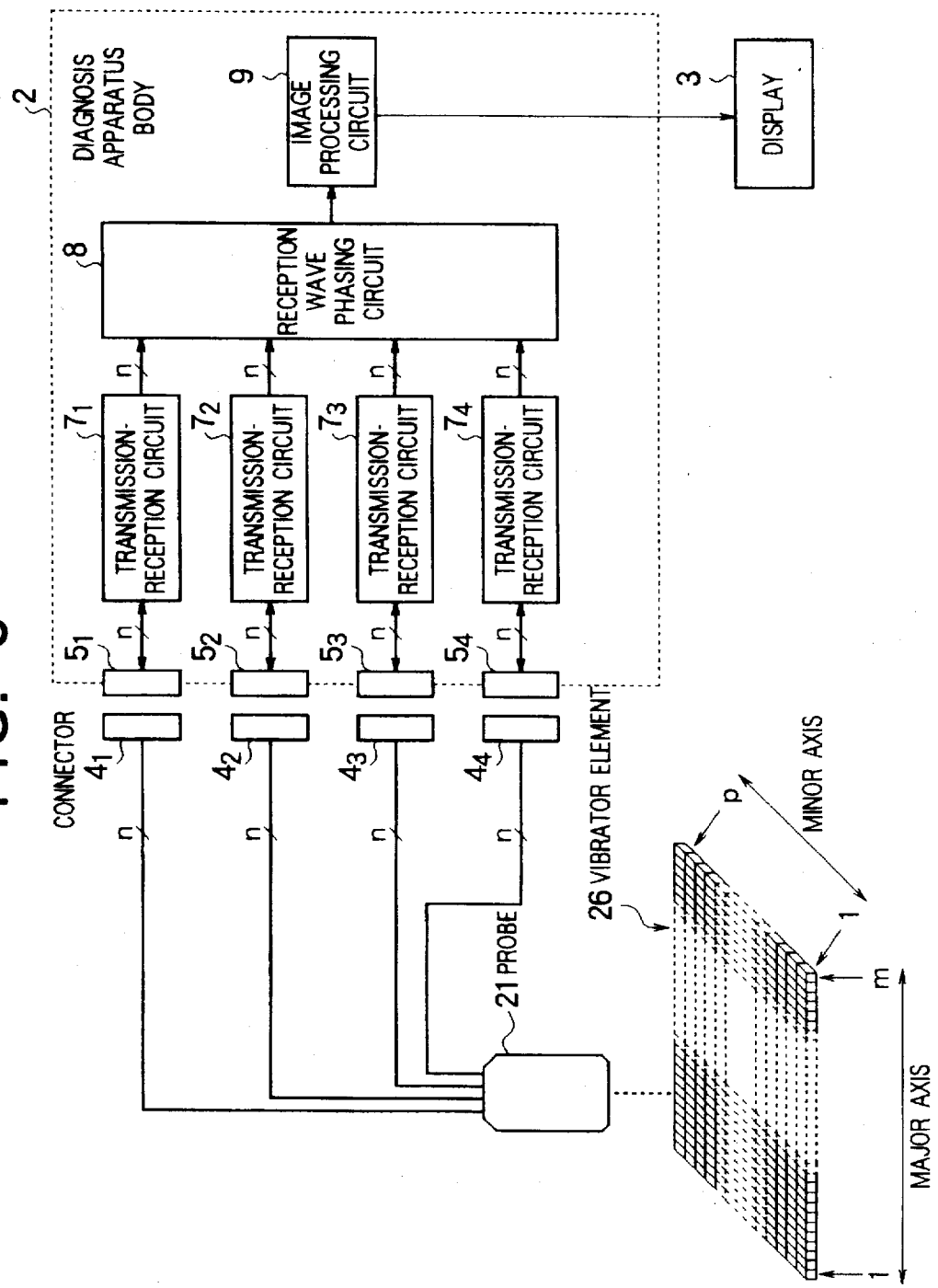
FIG. 3 is a block diagram showing the configuration of an ultrasonic diagnosis apparatus according to a third embodiment of the present invention.

FIG. 3 is a block diagram showing a third embodiment of the present invention. This embodiment is designed so that a probe 21 of two-dimensional arrangement having vibrator elements 26 arranged as a matrix of m columns in the direction of the major axis and p(p>k) rows in the direction of the minor axis is connected to the apparatus body 2 shown in FIG. 1. Because the probe 21 in this embodiment has a larger number of vibrator elements in the direction of the minor axis, a tomographic image can be formed by scanning ultrasonic waves in the direction of the minor axis in the same manner as in the direction of the major axis. Also in this case, vibrator element groups obtained by grouping the vibrator elements 26 into parts of the same predetermined number are connected to the respective connectors $4_1$ to $4_4$ which are connected to the apparatus body 2 side connectors $5_1$ to $5_4$, respectively, and the vibrator element groups obtained by the aforementioned grouping are scanned successively over the four connectors $4_1$ to $4_4$ (matrix scanning) in the manner as shown in FIG. 1 to thereby form one ultrasonic image.

Figure 4:
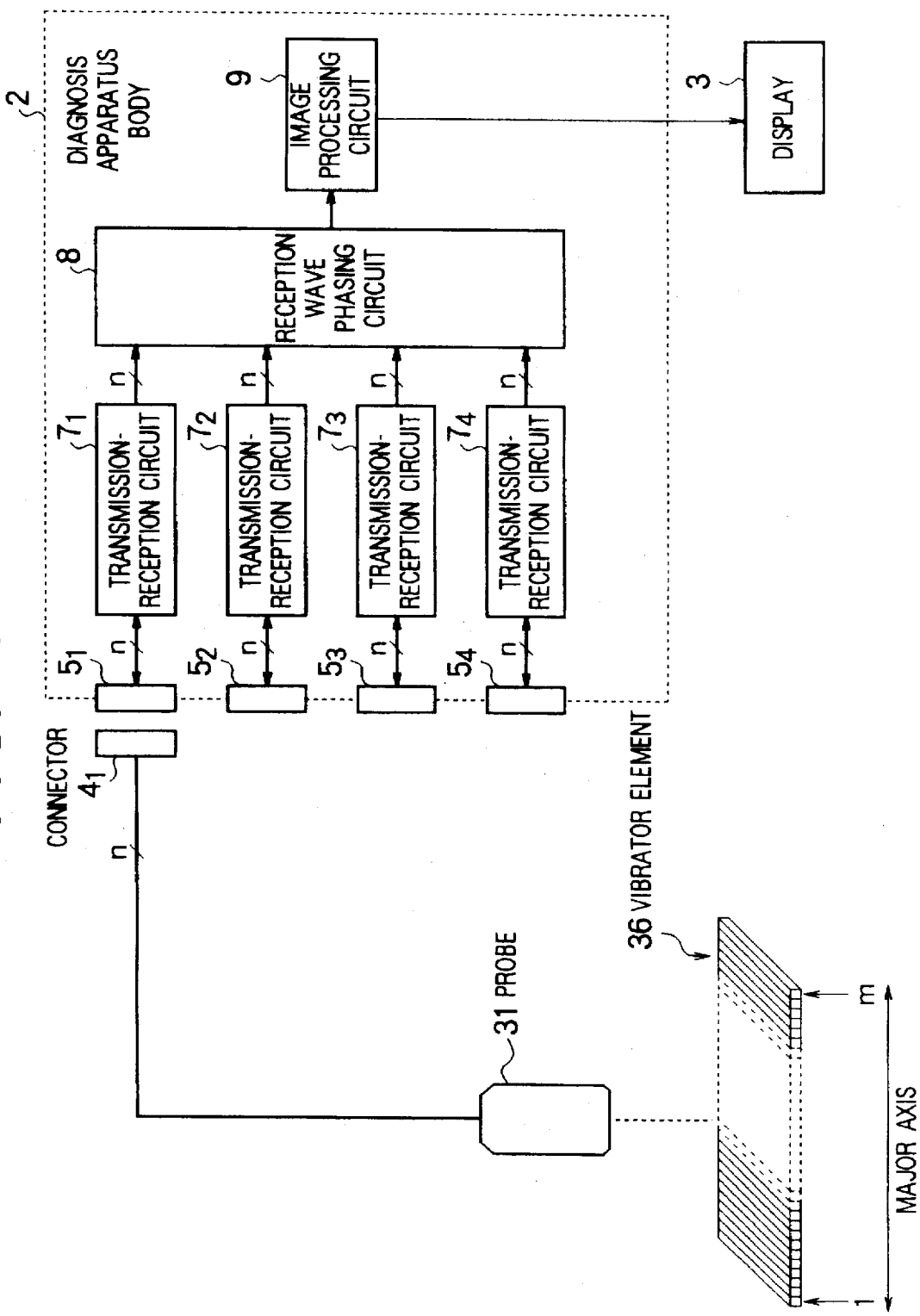
FIG. 4 is a block diagram showing the configuration of an ultrasonic diagnosis apparatus according to a fourth embodiment of the present invention.

FIG. 4 is an explanatory view showing a state of use in which a probe 31 provided with one conventional connector 4 constituted by an ordinary number (n) of pins is connected to the apparatus body 2 shown in FIG. 1. In this case, because each of connectors $5_1$ to $5_4$ provided in the input portion of the apparatus body 2 is formed so that n vibrator elements can be connected in the same manner as in the connector 4 and because there is the relation m≦n, the probe 31 can be connected to any one of the apparatus body 2 side connectors $5_1$ to $5_4$.

Figure 5:
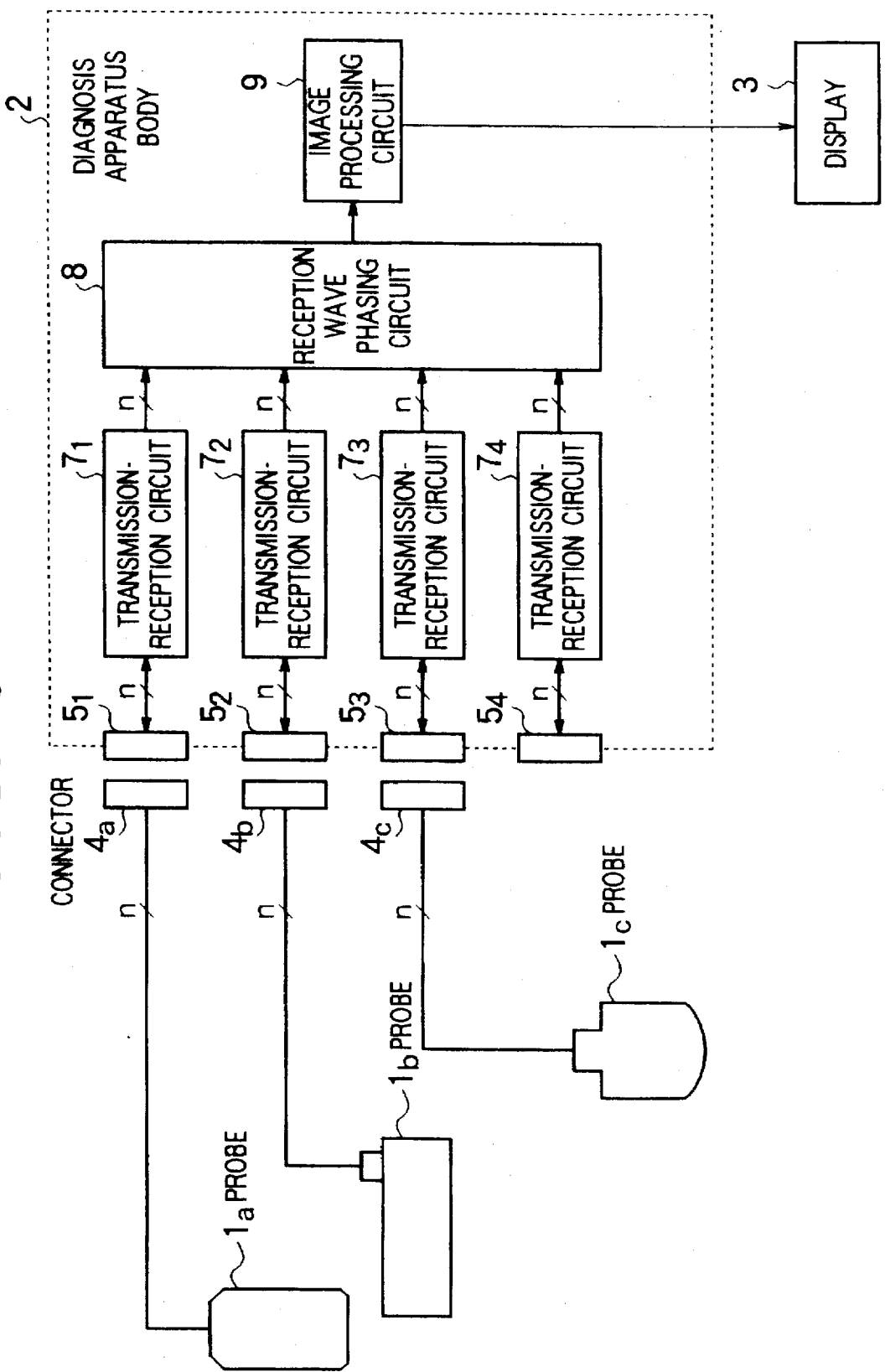
FIG. 5 is a block diagram showing the configuration of an ultrasonic diagnosis apparatus according to a fifth embodiment of the present invention.

Further, FIG. 5 is an explanatory view showing a state of use in which different types of probes 1a, 1b and 1c respectively provided with conventional connectors 4a, 4b and 4c each constituted by an ordinary number (n) of pins are connected to the apparatus body 2 shown in FIG. 1. Each of the respective types of probes 1a, 1b and 1c can be connected to any one of the apparatus body 2 side connectors $5_1$ to $5_4$ in the same manner as in FIG. 4, so that an ultrasonic image can be obtained in real time by switching the different types of probes 1a, 1b and 1c.

Figure 6:
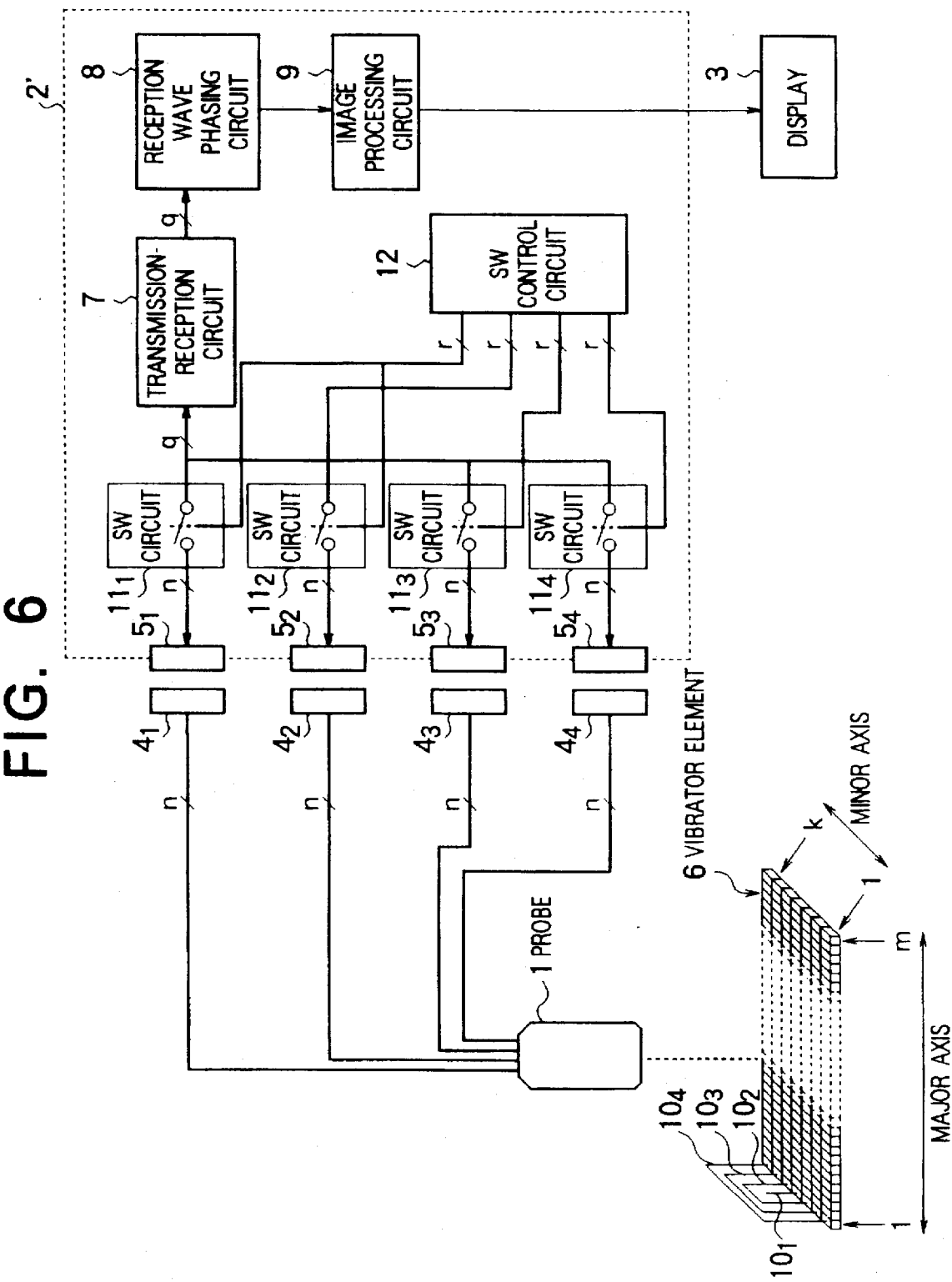
FIG. 6 is a block diagram showing the configuration of an ultrasonic diagnosis apparatus according to a sixth embodiment of the present invention.

FIG. 6 is a block diagram showing a fourth embodiment of the present invention. In this embodiment, in the inside of an apparatus body 2', switching circuits (hereinafter referred to as "SW circuits") $11_1$, $11_2$, $11_3$ and $11_4$ are provided on the respective output side of the connectors $5_1$ to $5_4$ provided in the input portion and a switching control circuit (hereinafter referred to as "SW control circuit") 12 is provided for controlling the on/off of the SW circuits $11_1$ to $11_4$ so that signals outputted from the SW circuits $11_1$ to $11_4$ are switched so as to be inputted to a common transmission-reception circuit 7. In this case, because there is no need of other transmission-reception circuits than the transmission-reception circuit 7 and because the number of channels in the reception wave phasing circuit 8 can be reduced, reduction in cost can be attained. Although FIG. 6 shows the case where the probe 1 shown in FIG. 1 is connected to the apparatus body 2' in this embodiment, it is to be understood that the invention is not limited thereto and that any one of the probes shown in FIGS. 2 to 5 can be also connected to the apparatus body 2' so that one ultrasonic image can be formed by performing successive scanning over the plurality of connectors $4_1$ to $4_4$ and $5_1$ to $5_4$.

Although the above description has been made upon the case where four connectors $5_1$ to $5_4$ are provided in the input portion of the apparatus body 2 or 2', it is to be understood that the invention is not limited thereto and that any number of connectors may be provided as long as the number is not one.

What is claimed is:

1. An ultrasonic diagnosis apparatus comprising:
   (a) a probe including:
   a vibrator element array including a plurality of vibrator elements,
   at least one of probe-side connectors, each having the same structure, and being connected through a signal path corresponding to each of said vibrator elements;
   (b) a diagnosis apparatus body including:
   body-side connectors, each having the same structure, and being connectable to at least said at least one of probe-side connectors respectively, the number of said body-side connectors being larger than the number of said probe-side connectors,
   ultrasonic wave transmission and reception circuits for receiving ultrasonic reception signals from said probe, the number of said ultrasonic wave transmission and reception circuits corresponding to the number of said body-side connectors and said ultrasonic reception signals being sent to said ultrasonic transmission and reception circuits through said at least one of probe-side connectors and said body-connectors,
   means for processing outputs of said ultrasonic wave transmission and reception circuits to form an image, and
   a display for displaying said image.

2. An apparatus according to claim 1, wherein said vibrator element array includes a plurality of groups of vibrator elements and said ultrasonic wave transmission and reception circuits transmit ultrasonic transmission signals to said body-side connectors within a predetermined period and receive ultrasonic reception signals from said probe such that ultrasonic waves are transmittable to said vibrator elements of a respective group or a part of said vibrator elements of said respective group within a predetermined period.

3. An apparatus according to claim 1, wherein said vibrator element array includes a plurality of groups of vibrator elements each of said connectors has a number of pins corresponding to the number of elements contained in each of said groups; and
   the number of vibrator elements in each group is equal, so that said connectors are equal to each other in the number of pins.

4. An apparatus according to claim 1, wherein said array is formed by arranging said vibrator elements two-dimensionally.

5. A probe for performing a scan for an ultrasonic diagnosis apparatus comprising:
   a vibrator element array including a plurality of groups of vibrator elements, and
   probe-side connectors, each having the same structure, and each connected to a respective group of said groups of vibrator elements through signal paths corresponding to respective groups of said groups of vibrator elements.

6. A probe according to claim 5, wherein said array is formed by arranging said vibrator elements two-dimensionally.

7. A diagnosis apparatus body to which a probe is connected, comprising:
   body-side connectors, each having the same structure, and connectable to probe-side connectors respectively, the number of said body-side connectors being larger than the number of said probe-side connectors;
   ultrasonic wave transmission and reception circuits for transmitting ultrasonic transmission signals to said body-side connectors, and for receiving ultrasonic reception signals from said probe the number of said ultrasonic wave transmission and reception circuits corresponding to the number of said body-side connectors;
   means for processing outputs of said ultrasonic wave transmission and reception circuits to form an image; and
   a display for displaying said image.

8. An ultrasonic diagnosis apparatus comprising:
   (a) a probe including:
   a vibrator element array having a plurality of groups of vibrator elements for forming one tomographic image,
   at least one of probe-side connectors, each having the same structure, and being connected to a respective group of vibrator elements through signal paths corresponding to said respective group of vibrator elements;
   (b) a diagnosis apparatus body including:
   body-side connectors, each having the same structure, and being connectable to at least said at least one of probe-side connectors respectively, and the number of said body-side connectors being larger than the number of said probe-side connectors,
   at least one ultrasonic wave transmission and reception circuit for receiving ultrasonic reception signals from said probe, said at least one ultrasonic wave transmission and reception circuit transmitting ultrasonic transmission signals to said body-side connectors within a predetermined period and receiving ultrasonic reception signals from said probe such that ultrasonic waves are transmittable to plural elements of said vibrator element array within a predetermined period,
   means for processing outputs of said at least one ultrasonic wave transmission and reception circuit to form said tomographic image, and
   a display for displaying said tomographic image.

* * * * *